United States Patent [19]

Urion et al.

[11] 4,210,043
[45] Jul. 1, 1980

[54] CUTTING ASSEMBLY

[75] Inventors: Kenard E. Urion, Woodbury, N.J.;
Douglas R. Cleminshaw, Tully, N.Y.

[73] Assignee: Scott Paper Company, Philadelphia, Pa.

[21] Appl. No.: 959,853

[22] Filed: Nov. 9, 1978

[51] Int. Cl.² .............................................. B26D 7/14
[52] U.S. Cl. ........................................ 83/175; 83/374;
83/455; 83/456
[58] Field of Search ..................... 83/175, 18, 20, 455,
83/456, 614, 454, 374

[56] References Cited

U.S. PATENT DOCUMENTS

| Re. 22,565 | 11/1944 | Gillanders et al. | 83/614 |
|---|---|---|---|
| 1,745,476 | 2/1930 | Cohn | 83/175 |
| 2,503,353 | 4/1950 | Pugh | 83/175 X |
| 3,142,217 | 7/1964 | Busse | 83/455 |
| 3,222,972 | 12/1965 | Fulton | 83/564 |
| 3,277,760 | 10/1966 | Keene et al. | 83/455 |
| 3,370,497 | 2/1968 | Busse | 83/455 |
| 3,463,040 | 8/1969 | Pouilloux | 83/374 |
| 3,641,854 | 2/1972 | Keesling | 83/175 X |
| 3,791,246 | 2/1974 | Lazickas | 83/455 X |
| 3,834,007 | 9/1974 | Lambiris | 29/453 |

Primary Examiner—Frank T. Yost
Attorney, Agent, or Firm—Martin L. Faigus; William J. Foley

[57] ABSTRACT

A cutting assembly of the type usable for severing a sheet into discrete elements includes an elongate track member having an elongate slot therein. A cutter slide is moveable in the slot and includes downwardly extending projections for both immobilizing and tensioning the sheet locally prior to, and during the severing operation. A method of forming the track, other articles having a segmented upper wall, by injection molding side sections and upper wall segments at an angle relative to the position they assume in the completed article, and thereafter rotating the side sections and upper wall segments about flexible, injection molded hinge sections to complete the formation of the article.

16 Claims, 9 Drawing Figures

CUTTING ASSEMBLY

TECHNICAL FIELD

This invention relates to a cutting assembly, and more particularly to a cutting assembly of the type employing a cutter slide moveable within a slot of an elongate track to sever sheet material into desired lengths. In addition the invention relates to a method of forming the track as a one-piece member.

BACKGROUND ART

It is often desirable to package sheet materials in roll form, and to provide a cutting mechanism for severing the sheets into desired lengths; depending upon intended use. It is quite common to package such rolls in cartons that are intended to be disposed of after the rolls have been depleted. Obviously any cutting mechanism employed as part of such a carton must be sufficiently economical to manufacture to justify its disposal along with the package. Although inexpensive mechanisms, such as serrated cutting bars, are known, they generally are not capable of accurately and easily cutting strong flexible sheet materials of the type that tend to stretch or flex as they are being subjected to a cutting force. Moreover, in the case of serrated cutting bars, it is quite easy for a person handling the package to inadvertently cut himself.

Although other types of cutters have been disclosed for use on boxes or cartons in which roll materials are packaged, a need does exist for improved low cost cutters which can be easily fabricated, which are reliable and safe in operation, and which are capable of cutting a wide variety of different sheet materials; particularly those that are strong, stretchable and flexible.

One prior art approach to cutting flexible sheet materials is to include the cutting element on a moveable assembly that has rotatable elements, such as wheels, to press the sheet material against a stationary plate or track for locally immobilizing the material as it is being cut. These devices have been found to work quite well; however, they are believed to be too expensive for the limited use encountered on packages of disposable products. The following patents disclose representative devices of the type employing rotatable elements as part of the cutter: U.S. Pat. Nos. 1,745,476 (Cohn); 2,503,353 (Pugh); 3,277,760 (Keene et al); 3,463,040 (Pouilloux) and 3,791,246 (Lazickas).

A different type of cutting assembly employs a clamping arrangement that is operated independently of a sliding cutter to immobilize the sheet prior to the cutting operation. In this type of device the clamping action is achieved between a stationary surface and a hinged, moveable surface. The use of relatively moveable clamping elements increases the overall cost and complexity of the cutting assembly, as compared to assemblies in which separate clamping bars, independent of the cutter slide, are not utilized. The following patents disclose representative devices of the type employing moveable clamping elements: U.S. Pat. Nos. 3,142,217 and 3,370,497 (Busse) and 3,222,972 (Fulton).

A fairly simple cutting assembly is disclosed in U.S. Pat. No. Re 22,565, issued to Gillanders et al. This device is designed for use in cutting adhesive tape, and employs a cutter knife that is adapted to move along an elongated slot in a cylindrical bore. A handle is secured to the upper end of the knife to aid in moving the knife along the slot, and the handle is provided with laterally spaced-apart wings to prevent accidental contact of the blade by the user. The wings also are employed to press the adhesive surface of the tape against a bead adjacent the slot to adhesively attach the tape to said bead. Although this cutter may be suitable for immobilizing adhesive tape by pressing its adhesive surface against the guide in which the knife is slid, there is no mechanism, either provided or suggested, for adequately immobilizing non-adhesive sheet materials during a cutting operation.

An improvement over the Gillanders et al construction has been invented by Balbir Singh and Ernest M. Pinhak, and is disclosed in co-pending U.S. Pat. application Ser. No. 959,359, entitled "Cutting Assembly", and filed on even date herewith. In the Singh et al assembly a top surface of a track is roughened, and a cutter slide, moveable in the track, includes an extremely smooth stationary lower surface overlying the roughened track surface to press the sheet material to be cut against said roughened track surface as the cutting operation is performed. Although this type of system represents a very economical approach to immobilizing non-adhesive sheet materials during a cutting operation, it may not provide the desired degree of immobilization and tensioning for reliably cutting extremely strong and stretchable sheets.

Applicants' cutting assembly is an improvement over that disclosed in the Singh et al patent application.

In order to economically manufacture the cutting assembly it is highly desirable to form it of a minimum number of components. To this end it is highly desirable to be able to form the elongate track as a single unit, and in a form that will permit the cutter slide to be mounted and retained within an interior compartment thereof.

It is known to mold two sections of an article as a single unit with a hinge section between them to permit the sections to be moved together to form a closed interior compartment, as is exemplified in U.S. Pat. No. 3,834,007, issued to Lambiris. In order to mold an elongate track or article having a split upper wall capable of defining a slot that communicates with an interior compartment, the split upper wall sections should initially be moldable in an opened position to permit insertion of the cutter slide. This type of forming technique is not suggested by Lambiris. Thereafter, the upper wall sections should be moveable into, and retained in the position they assume in the final track configuration to both trap the cutter slide in the interior compartment and form the slot in which the cutter slide is moveable. Clearly this type of forming technique is not suggested by Lambiris.

The instant invention relates to a simple and reliable cutting assembly, and to a unique method that can be employed to form, as a one-piece unit, the track of the cutting assembly.

DISCLOSURE OF INVENTION

This invention relates to a cutting assembly of the type employing an elongate track and a cutter slide moveable within a slot of the track. The cutter slide is free of elements that move relative to each other during the cutting operation, and includes a cutting element having a cutting edge for severing a sheet into desired discrete lengths when the sheet is draped over the slot in the track. More specifically, the cutter slide includes a top wall overlying the cutting element. This top wall includes first means directed downwardly therefrom for forcing a section of the sheet against the track as the cutter slide is moved to thereby locally immobilize the sheet prior to the severing operation. Moreover, the top wall includes second means directed downwardly for engaging the immobilized sections of the sheet, as the cutter slide is moved, to tension the sections to be cut into a taut condition over the slot in the track prior to the severing operation. Thus, in accordance with this invention, separate means are employed to immobilize and tension the sheet, respectively, prior to severing. Moreover, this occurs locally in the region where the cutting operation is being performed, and without providing any cutter slide elements that are moveable relative to each other during the cutting operation. In fact, the cutter slide is provided by a series of injection molded parts that are connected together in nonmoving relationship to each other, and that are adapted to secure and retain the cutting element(s) with it.

As a second aspect of this invention a unique method is employed to form a one-piece member having an internal compartment defined in part by a bottom wall, side sections joined to said bottom wall and a split upper wall formed in two segments; each segment being a continuous extension of one side section. In this regard reference throughout this application to "bottom", "upper", "side" and "end" are intended to describe relative, rather than absolute positions.

The method of this invention is useable to form the elongate track of the cutting assembly. When molding the track, the segments of the split upper wall will be dimensioned so that they will be spaced from each other to provide the elongate slot in which the cutter slide is moveable, and also to provide the upper wall of an interior compartment in which the slide is retained.

In accordance with the method of this invention the bottom wall and side sections of the one-piece member are injection molded with the side sections at an angle relative to the bottom wall. The bottom wall is joined to the side sections through thin, flexible hinge sections. The upper wall segments of the members are integrally injection molded with respective side sections, and at an angle relative to their orientation in the completed article. When forming the elongate track, the upper wall segments preferably are molded at an angle of substantially 90 degrees to the position they will assume when the track is ready for use. Thus, as initially molded, the interior compartment of the track is opened up to permit a lower enlarged section of the cutter slide to be positioned in it. Thereafter, the side sections and upper wall segments of the track are rotated through substantially 90 degrees about the thin flexible hinge sections to complete the formation of said track.

Opposite ends of the track, or other one-piece article, preferably are formed in two separate segments; each segment forming a continuous extension of a respective upper wall segment. Like the upper wall segments, the end segments are injection molded in a position angularly related to the position they will assume in the completed article, and are moved into their assembled and operative positions by rotation of the side sections about their hinged connection to the bottom wall. Most preferably one end segment at each end of the one-piece member is provided with a male connector, and the other end segment is provided with a female connector. These male and female connectors are adapted to cooperate with each other, after the end segments have been rotated about the flexible hinge sections to their operative position, to retain the unitary member in said operative orientation with the split upper wall overlying at least a part of the bottom wall.

It is an object of this invention to provide a cutting assembly which is economical to construct and reliable in operation.

It is a further object of this invention to provide a cutting assembly employing a cutter slide moveable in an elongate track, wherein the cutter slide is free of elements that move relative to each other during the cutting operation.

It is a further object of this invention to provide a cutting assembly which simply and reliably immobilizes and tensions sections of the sheet as they are being cut.

It is a further object of this invention to form a one-piece member having an internal compartment defined, in part, by a continuous bottom wall and a split upper wall.

It is a further object of this invention to form a one-piece member having an internal compartment closed at least at its bottom, ends and sides, and including a split upper wall.

It is a further object of this invention to provide a method of forming a one-piece member, in the form of an elongate track, having an internal compartment defined in part by a continuous bottom wall and a split upper wall, wherein the split upper wall defines an elongate slot in which a cutter slide of the cutting assembly is moveable.

Other objects and advantages of this invention will become apparent by referring to the detailed description of the best mode of this invention, taken in connection with the drawing.

BEST MODE FOR CARRYING OUT THE INVENTION

Figure 1:
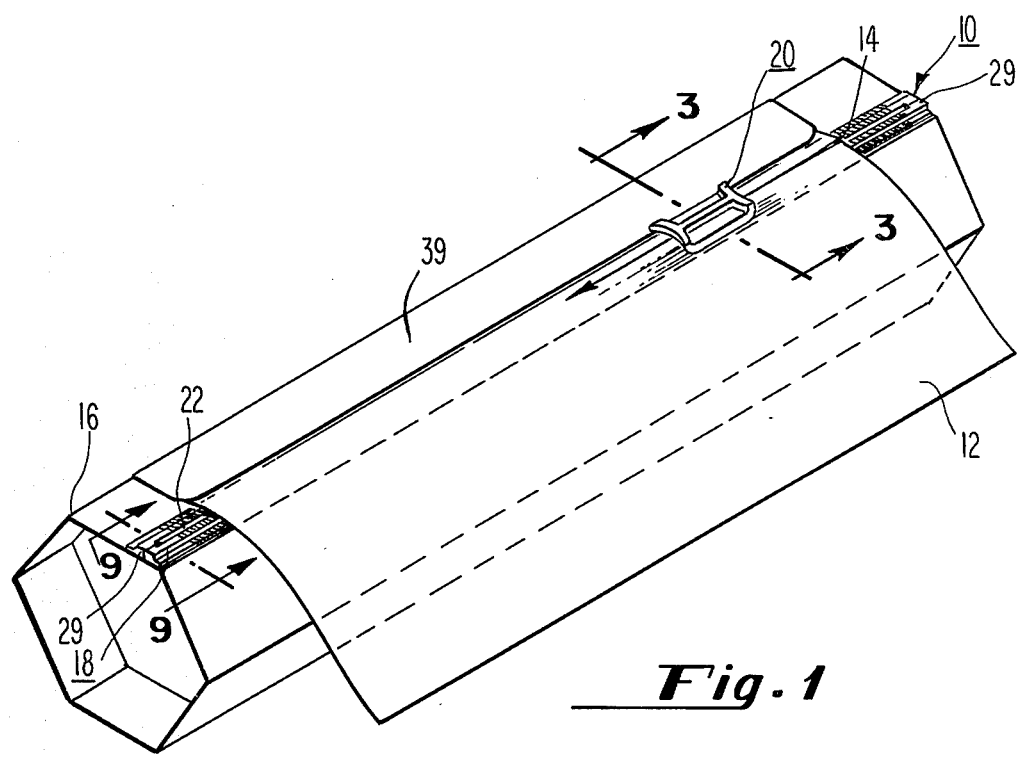
FIG. 1 is an isometric view showing the cutting assembly of this invention mounted on a box in which sheet material to be cut is packaged.

Referring to FIG. 1, the cutting assembly 10 of this invention is employed to sever a sheet or web 12 into discrete sections along a cut line 14. In the illustrated embodiment the sheet to be cut is packaged in roll form in a box 16 to which the cutting assembly 10 is attached.

Figure 2:
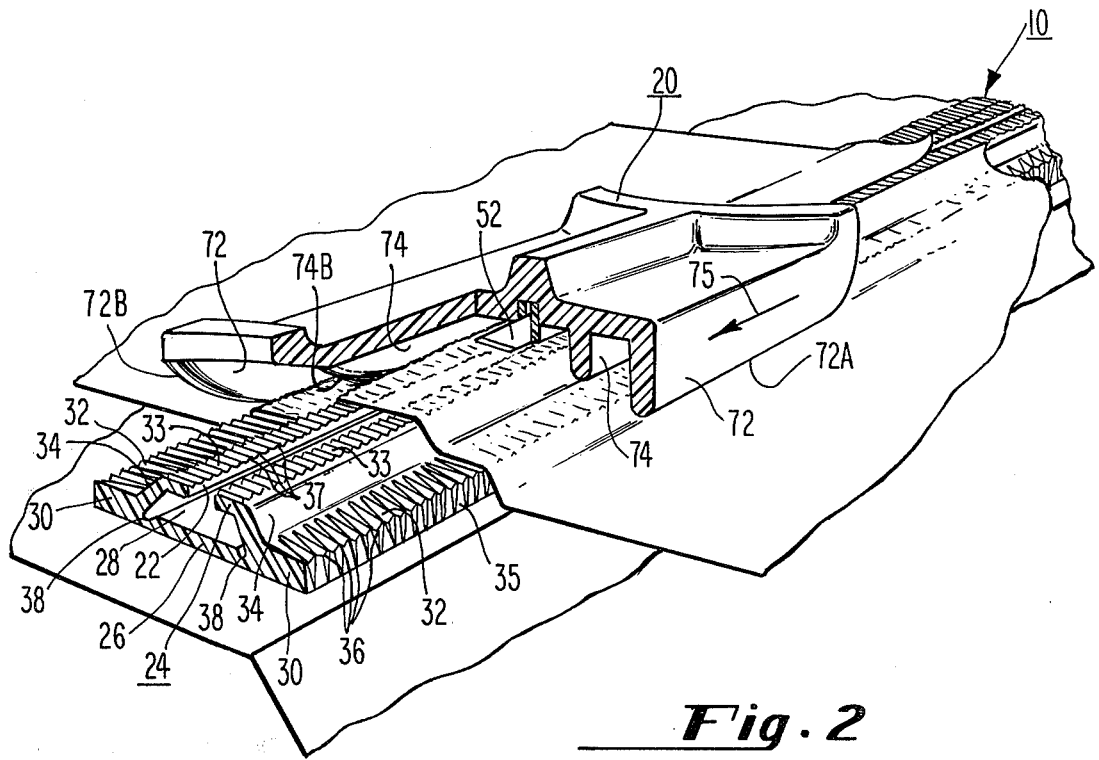
FIG. 2 is a fragmentary, isometric view of the cutting assembly of this invention with parts of the cutter slide broken away to show details of construction.
Figure 9:
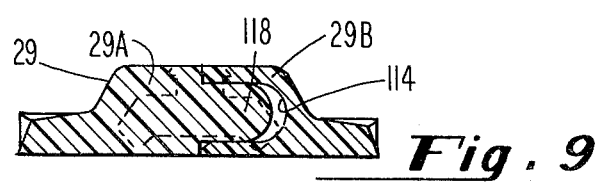
FIG. 9 is a sectional view taken along line 9—9 of FIG. 1, depicting the closed orientation of the elements that are molded in FIG. 8.

Referring to FIGS. 1 and 2, the cutting assembly 10 includes a track 18 and a cutter slide 20. The cutter slide is movable within an elongate slot 22 provided through a centrally located upper wall 24 of the track. The upper wall 24 is spaced vertically above a centrally located bottom wall 26 to aid in defining an interior compartment 28 in which the cutter slide 20 is trapped. The slot 22 and the interior compartment 28 are closed at the opposite ends 29 of the track (FIGS. 1 and 9) to prevent the slide from being slid out of engagement with said track.

Referring to FIG. 2, the track 18 also includes marginal sections 30 having upper surfaces 32 spaced below upper surfaces 33 of the centrally located upper wall 24. These marginal sections 30 are interconnected to the upper wall 24 through opposed sloping sections 34 that also provide sidewalls of the interior compartment 28.

Figure 3:
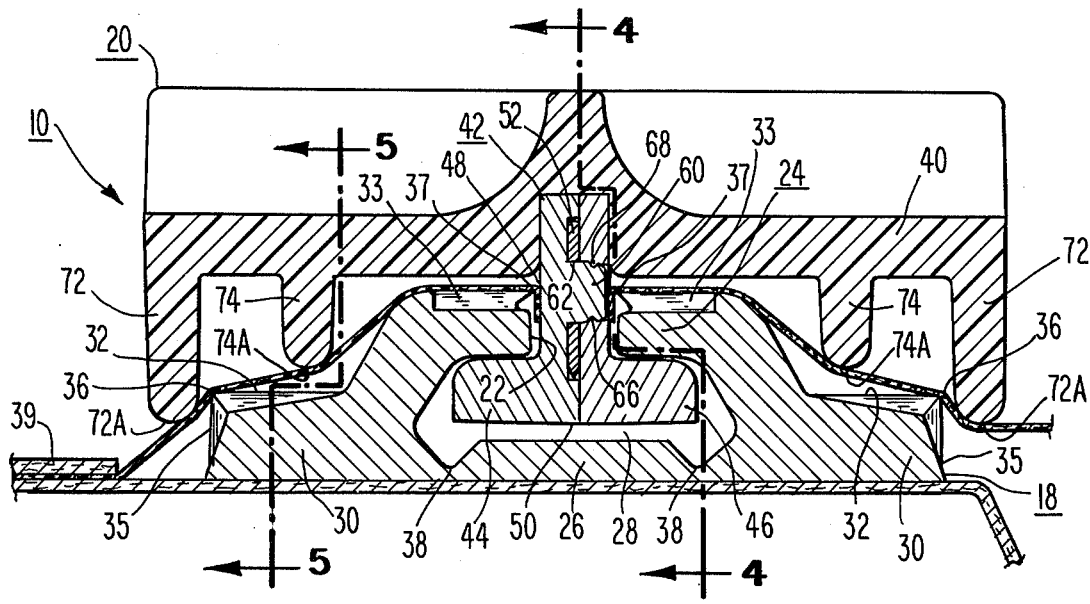
FIG. 3 is a sectional view taken along line 3—3 of FIG. 1.

Referring to FIGS. 2 and 3, elongate side surfaces 35 of the track and the elongate upper surfaces 32 of the marginal sections 30 are serrated, or grooved along a major portion of their elongate dimensions to provide a series of spaced-apart points 36 along the outer side edges of the track 18. These points cooperate with sections of the cutter slide 20 to aid in immobilizing the sheet to be cut, prior to and during cutting, in a manner which will be described in detail hereinafter. The upper surfaces 33 of the centrally located upper wall 24 also are serrated along a major portion of their elongate dimension to provide a series of spaced-apart points 37 along the opposed edges of the slot 22. These points 37 cooperate with the cutting elements to immobilize the sheet closely adjacent the cut line in a manner that will be explained in greater detail later in this application.

As can be seen best in FIGS. 2 and 3, spaced-apart thin zones 38 interconnect the centrally located bottom wall 26 to end marginal section 30 of the track 18. The purpose of these thin zones 38 will be described in greater detail hereinafter in connection with the method of manufacturing the track. When the track is in its operative condition, as shown in FIGS. 2 and 3, the lower surfaces of the bottom wall 26 and marginal sections 30 lie in the same horizontal plane. These surfaces are adhesively secured, or otherwise fastened to an outer sidewall of the box 16 adjacent a sheet dispensing opening underlying a flap 39 (FIG. 1).

Figure 4:
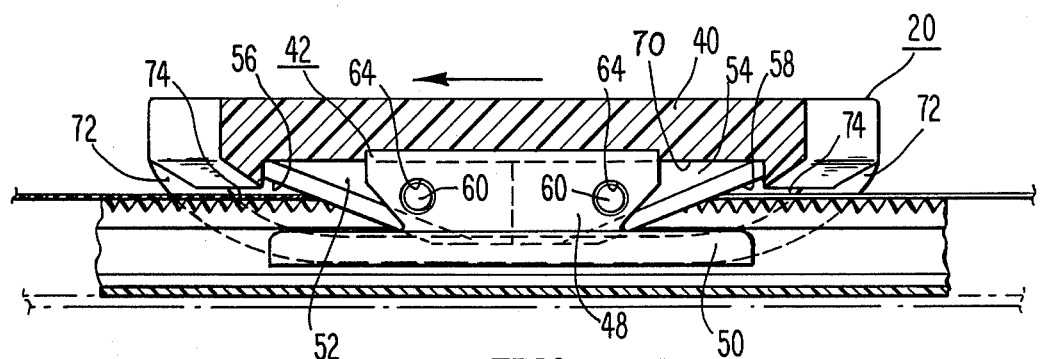
FIG. 4 is a sectional view taken along line 4—4 of FIG. 3.
Figure 5:
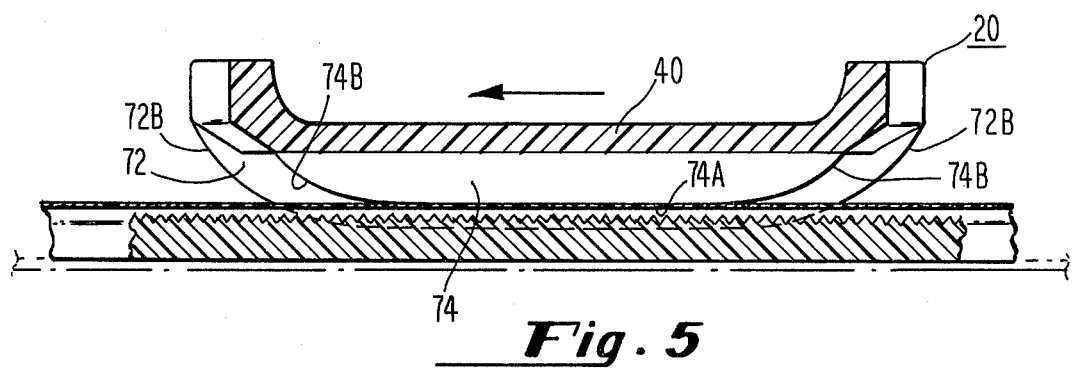
FIG. 5 is a sectional view taken along line 5—5 of FIG. 3.

Referring to FIGS. 3–5 the cutter slide 20 includes a top member 40 connected to a blade retainer 42. The retainer is formed by opposed male and female sections 44 and 46, respectively, and includes a central web section 48 extending through the elongate slot of the track 18, and an enlarged flange section 50 within the interior compartment 28 of said track. The enlarged section 50 underlies the centrally located upper wall 24 on opposite sides of the elongate slot 22 to prevent the cutter slide 20 from being pulled out of the track.

As can be seen best in FIG. 4, two blades 52 and 54, having obliquely oriented cutting surfaces 56 and 58, respectively, are secured to the blade retainer 42 for cutting the web 12 when the cutter slide is moved in either direction within the slot 22 of the track. The blades are connected to the retainer by positioning male projections 60 associated with the male section 44 through respective openings 62 provided in the blades 52 and 54, and then into projection-receiving openings 64 in the female section 46. Both of the male projections 60 are identical in construction; each including an annular groove 66 formed adjacent an end thereof (FIG. 3). The openings 64 provided in the female section 46 also are identical; each including an annular rib 68 for engaging the annular groove 66 associated with the male projection it receives to thereby lock the male and female sections of the retainer together (FIG. 3). The blade retainer 42, after it has been assembled, is secured within an elongate recess 70 formed in the underside of the slider top 40. This securement can be achieved by employing an adhesive substance, or, most preferably, by ultrasonic bonding.

Referring to FIGS. 2–5 the slider top 40 has a unique construction that cooperates with the track 18 to provide the desired benefits of this invention. Specifically, the slider top 40 includes a pair of downwardly directed outer rails, or projections 72 that are spaced outwardly of, but close to the spaced-apart points 36 formed at the junction of the upper surface 32 and the side surface 35 of each of the marginal sections 30. These projections 72 include lower, horizontally extending surfaces 72A located below the upper surfaces 32 of the marginal sections 30. As the slide 20 is moved these lower horizontally extending surfaces force the sheet 12 against the spaced-apart points 36 to thereby locally immobilize said sheet.

The slider top 40 further includes a pair of downwardly directed inner rails, or projections 74 spaced inwardly of the outer rails 72; closer to the cutting blades 52 and 54. Referring to FIG. 3, the inner projections 74 include lower, horizontally extending surfaces 74A located above the horizontally extending surfaces 72A of the outer rails 72.

As can be seen best in FIGS. 2 and 5, opposite ends 72B of the outer rails 72 are generally curved, and extend beyond generally curved outer ends 74B of the inner rails 74. These curved ends prevent the rails 72 and 74 from snagging the sheet 12 as they guide said sheet into engagement with the lower, horizontally extending surfaces 72A and 74A of said rails.

As can be seen best in FIG. 4 the cutting edges 56 and 58 of the blades 52 and 54, respectively, are located inwardly of the inner rails 74 to permit both the outer rails 72 and the inner rails 74 to provide their desired interaction with the sheet 12 and the track 18 prior to commencing the cutting operation. Moreover, the arrangement of the inner and outer rails of the slider top 40, in conjunction with the track 18, makes the blades 52 and 54 inaccessible to contact during normal usage.

In operation the cutter slide 20 will locally immobilize and tension the sheet 12 prior to the cutting operation, and will maintain the immobilized and tensioned condition of the sheet during said cutting operation. Specifically, as the cutter slide 20 is moved along the track, for example in the direction of arrow 75 in FIG. 2, the sheet 12 first will be engaged by the lower horizontally extending surfaces 72A of the outer rails 72. The sheet will be guided into engagement with these lower surfaces by the curved ends 72B. The lower surfaces 72A will force the sheets into engagement with the spaced-apart points 36 provided at the junction between the upper surface 32 and side surface 35 of each marginal section 30 to initially immobilize the sheet over the elongate slot 22. Thereafter the sheet will be engaged by the lower surfaces 74A of the inner projection 74. Since the sheet will already have been impaled, or immobilized over the points 36 at the time the lower surfaces 74A of the inner rails engage the sheet, these lower surfaces 74A will act to tension said sheet across the elongate slot 22. The inner projections 74 are spaced to vertically overlie the sheet 12 in a region between the points 36 and the centrally located upper track wall 24 to force the sheet downwardly, and thereby accomplish this tensioning function. Since the lower horizontal surfaces 74A of the inner projection 74 extend beyond the cutting edges of the blades 52 and 54, the tensioning operation will take place prior to the cutting operation. In addition, since both sets of rails 72 and 74 are aligned with the blades and extend beyond the cutting surfaces in both directions, the immobilizing and tensioning functions will be provided during the cutting operation. Moreover, due to the oblique orientation of the cutting edges 56 and 58, the sheet 12 will be forced downwardly into the track slot during the cutting operation (FIG. 3) to locally immobilize the sheet against the spaced points 37 close to, and on opposite sides of the cut line 14 (FIG. 1). This improves the cutting action by minimizing the tendency for the sheet to be buckled, or plowed, rather than be cut when exposed to the horizontal force component imposed on the sheet by the cutting blades 52 and 54.

The cutting assembly 10 of this invention can be employed advantageously to cut many different types of sheet materials. However, the greatest benefits can be achieved by employing this cutting assembly to sever sheets that are strong, flexible and elastic. It is these latter types of sheets which generally tend to be plowed, rather than be cut by the cutting blade, unless they are adequately maintained in an immobilized, taut condition over the track slot as the cutting operation is performed. The present invention achieves both the immobilizing and tensioning functions in an economical and reliable manner by, in part, employing a cutter slide that does not rely upon relatively movable parts, such as rolls and belts, to aid in the cutting operation.

All sections of the cutting assembly 10, with the possible exception of the blades 52 and 54, can be molded out of a suitable plastic material, such as an acetal resin, in an economical manner. Because the cutting assembly is an economical, low cost item, it is economically feasible to employ the assembly on boxes housing roll materials that are intended to be disposed of after the roll has been spent. Although the preferred embodiment of this invention employs the cutting assembly 10 on a box housing a roll of web material, the cutting assembly 10 can be employed in other environments wherein high quality, low cost cutting applications are desired.

Referring to FIGS. 6-9, the track 18 is injection molded as a single unit in a unique manner. Specifically, the track is molded with the interior compartment 28 thereof in an opened condition, and, after the cutter slide 20 is properly positioned relative to said interior compartment, the track is bent, or pivoted into its closed position about the spaced-apart thin zones 38 to thereby trap the cutter slide within said interior compartment (FIG. 3).

Figure 6:
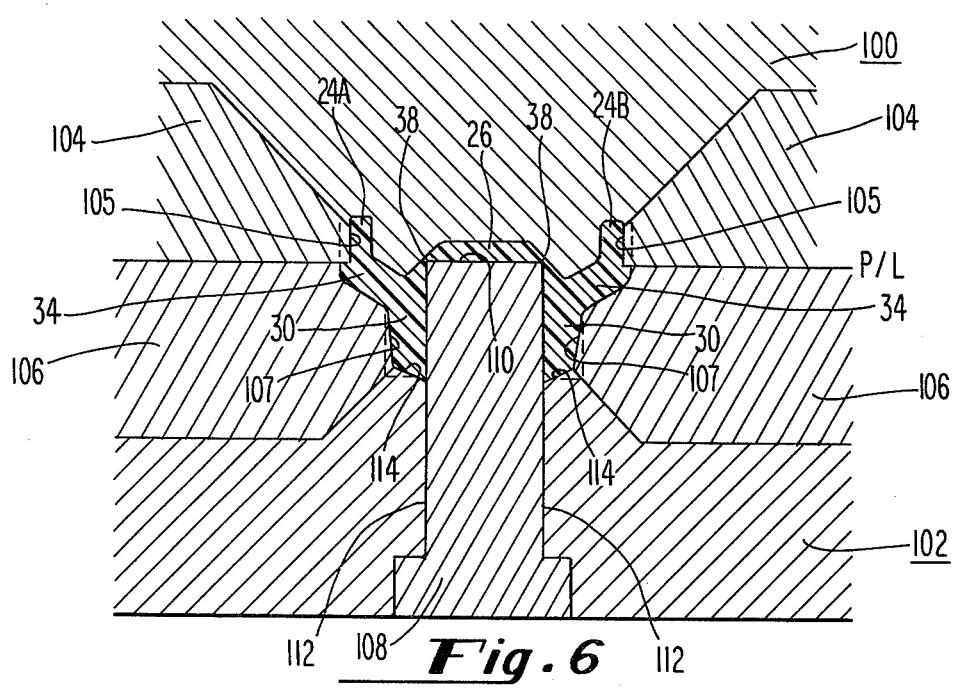
FIG. 6 is a cross-sectional view through an injection mold showing the arrangement of cavities employed to form the region of the elongate track illustrated in FIG. 3.

FIG. 6 shows the cavity configuration established between the upper and lower mold sections 100 and 102 for molding the region of the track in which the elongate slot 22 is provided, such as the region shown in FIG. 3. These mold sections are separable along a parting line, P/L, to permit removal of the track after the injection molding operation.

The upper mold section 100 is provided with laterally spaced-apart inserts 104 having inwardly facing, grooved surfaces 105 for forming the serrations in the upper surfaces 33 of upper wall segments 24A and 24B. These segments, in the completed track assembly, cooperate to define the centrally located upper wall 24 having the elongate slot 22 therethrough (FIG. 7).

The lower mold section 102 is provided with laterally spaced-apart inserts 106 having inwardly facing grooved surfaces 107 to form the serrations in the upper surfaces 32 of the marginal track sections 30. The lower mold section also includes an insert, in the form of a plug 108. This plug includes a horizontally disposed top surface 110 and side surfaces 112 disposed 90° to said top surface for cooperating in defining cavities in which the centrally located bottom wall 26 and marginal sections 30 of the track are formed. Specifically, the plug 108 cooperates with opposed surfaces in the upper mold section 100 to define a cavity region in which the centrally located bottom wall 26 is formed, and also, a thin cavity region in which the thin zones 38 are formed to continuously join the bottom wall 26 to the marginal sections 30. The lower mold section 102 includes upwardly facing surfaces 114 closely adjacent the side surfaces 112 of the plug 108, and these upwardly facing surfaces are grooved to form the serrations in the side surfaces 35 of the track.

Figure 7:
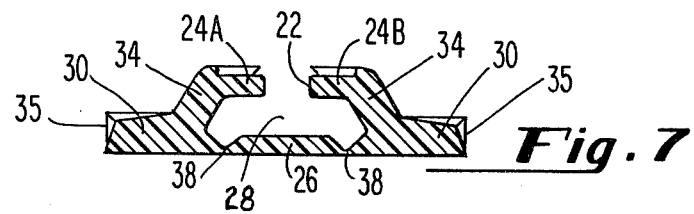
FIG. 7 shows the section of the track molded in FIG. 6, but in its final orientation after being pivoted into a closed condition.

In the preferred method of this invention the marginal sections 30, sloping sections 34 and centrally located upper wall segments 24A and 24B of the track are all molded 90° to the positions they are required to assume in the completed track assembly illustrated in FIG. 7. In fact, only the centrally located bottom wall 26 is molded in the position it assumes in the completed track assembly.

It should be apparent that the cutter slide 20, after it has been completely assembled, can be mounted with the track 18 by positioning the enlarged bottom flange 50 thereof adjacent the centrally located bottom wall 26 of the track, when the track is in its opened orientation illustrated in FIG. 6. In this condition the upper wall segments 24A and 24B are oriented 90° to the position they will assume in the completed track assembly to permit the enlarged bottom flange 50 to be placed in the region of the centrally located interior compartment 28 of the completed track assembly. Thereafter, the track can be bent, or pivoted about its flexible thin zones 38 into the configuration shown in FIG. 7 to trap the flange 50 within the interior compartment 28, as can be seen best in FIG. 3.

Figure 8:
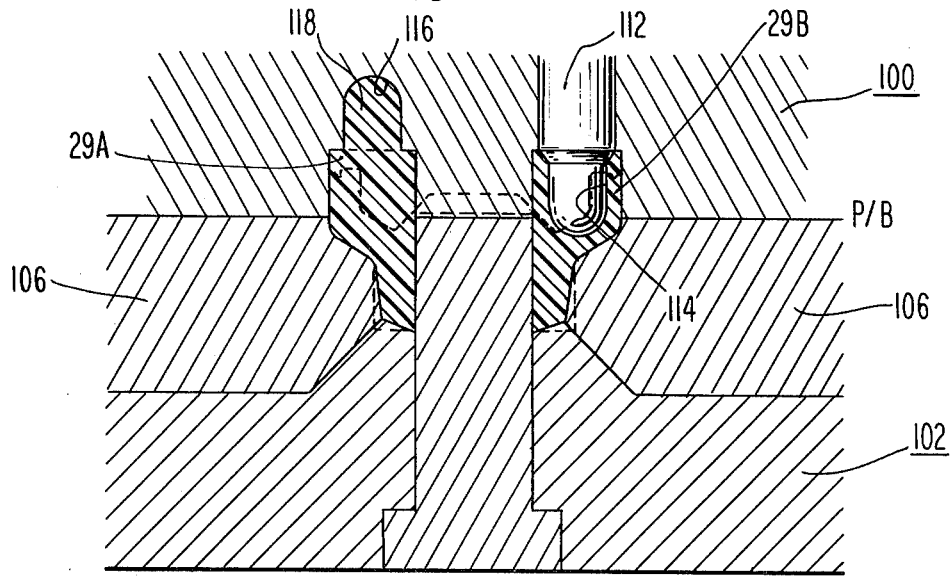
FIG. 8 is a cross-sectional view through the injection mold showing the arrangements of cavities for molding the closed elongate ends of the track.

As described earlier, the elongate ends 29 of the track 18 are closed to prevent the cutter slide 20 from being slid out of the elongate slot 22 when said slide is moved to the opposite ends of said slot. The manner in which the closed ends are molded can be seen best in FIG. 8. It should be understood that each of the ends 29 are molded in the same manner. As can be seen in FIG. 8, the thin, hinged zones 38 do not extend to the opposed ends 29 of the track. However, the ends 29 are molded in two segments 29A and 29B that are oriented 90° to the position they are required to assume in the completed track assembly. A male plug member 112 is retained in the upper mold section 100 for forming a female cavity 114 in one of the and segments 29B. The upper mold section 100 also includes a cavity section 116 for forming a male projection 118 associated with the other end segment 29A. The inserts 106 in the lower mold section, in the region of the end margins 29, do not need to include grooves in them to form serrations in the upper surfaces of the marginal track sections 30, since the cutting of the sheet takes place inwardly of these marginal ends. It should be clear from FIGS. 8 and 9 that the end sections 29, like the central region of the track, are moved into a closed condition only after the track has been pivoted about the elongate, spaced-apart thin zones 38.

The above-described arrangement for integrally molding the track 18 as a one-piece unit permits the formation of a slot, or narrow opening 22, through an upper wall 24 to cooperate with an undercut interior compartment 28 that is closed at the opposed ends of said track. Although the molding technique has been described in connection with the formation of the elongate track 18 of this invention, it is within broader aspects of the method invention to form other one-piece members having a central, or interior compartment defined in part by a continuous bottom wall and a split upper wall. In this regard the split upper wall can be formed of segments that are spaced apart to define a slot or opening, or alternatively, the segments can butt against each other to form a completely enclosed compartment.

Although the invention has been described with a certain degree of particularity, it is understood that the present disclosure has been made only by way of example, and that numerous changes in the details of construction and in the combination and arrangement of parts may be resorted to without departing from the scope of the invention.

We claim:

1. A cutting assembly of the type usable for severing a sheet into discrete elements, said assembly including:
   an elongate track member having an elongate slot therein; and
   a cutter slide movable in said slot, said cutter slide including first means for forcing sections of the sheet against the track on opposite sides of the slot to immobilize said sheet, and second means for engaging the sheet on opposite sides of the slot to tension immobilized sections of said sheet prior to severing.

2. A cutting assembly of the type usable for severing a sheet into discrete elements, said assembly including:
   an elongate track member having upper wall segments terminating in spaced-apart inner surfaces that define an elongate slot between them;
   a cutter slide movable in said slot and including a cutting element having a cutting edge for engaging and severing the sheet when said sheet is positioned over the slot in a taut condition, the improvement wherein the cutter slide includes:
   a top wall overlying the cutting element;
   first means directed downwardly from the top wall for forcing sections of the sheet against the track on opposite sides of the slot as the cutter slide is moved to locally immobilize said sheet;
   second means directed downwardly from the top wall for engaging immobilized sections of the sheet on opposite sides of the slot as the cutter slide is moved to tension said sections into a taut condition over the slot;
   said first and second downwardly directed means being aligned with the cutting edge for maintaining the sections of the sheet immobilized and tensioned prior to and during the severing of said sections.

3. The cutting assembly of claim 2 wherein the first downwardly directed means includes a first pair of outer projections that are laterally spaced-apart on opposite sides of the cutting element, the second downwardly directed means includes a second pair of inner projections that are laterally spaced-apart on opposite sides of the cutting element.

4. The cutting assembly of claim 3 wherein the first pair of projections extend beyond the second pair of projections in the elongate direction of severing, whereby sections of the sheet are immobilized prior to being tensioned.

5. The cutting assembly of claim 4 wherein the cutting element is positioned intermediate opposed ends of the first and second pairs of projections.

6. The cutting assembly of claim 5 wherein the cutting element includes oppositely directed cutting edges for permitting the sheet to be severed by moving the cutter slide in either elongate direction.

7. The cutting assembly of claim 3 wherein the elongate track includes substrate impailing surface means along opposed elongate outer edges thereof, said first pair of projections extending laterally beyond said outer edges for forcing the substrate against the impailing means to aid in the immobilization function.

8. The cutting assembly of claim 7 wherein the upper wall segments of the track that define the elongate slot are disposed above the elongate outer edges of the track that include the substrate impailing surface means.

9. The cutting assembly of claim 8 wherein the second pair of projections extend downwardly from the top wall a shorter distance than the first pair of projections, said second pair of projections being spaced laterally outwardly of the upper wall segments that define the slot, and inwardly of the outer edges that include the impailing surface means.

10. A method of forming a one-piece member having a compartment defined in part by a bottom wall, side sections joined to said bottom wall and a split upper wall formed in two segments, each of said segments being joined to one of said side sections; said method including the steps of
    (a) molding the side sections at an angle to the bottom wall and joined to said bottom wall through thin, flexible hinge sections;
    (b) molding both upper wall segments as continuous extensions of respective side sections and at angles relative to their required orientation in the completed member, one upper wall segment and its associated side section being joined to the bottom wall through one flexible hinge section and the other upper wall segment and its respective side section being joined to the bottom wall through the other flexible hinge section; and
    (c) rotating the side sections and upper wall segments about the flexible hinge sections to move the upper wall segments into overlying relationship with at least a portion of the bottom wall.

11. The method of claim 10 wherein the step of pivoting the molded part is carried out to move lower surfaces of the side sections into substantially the same plane as the lower surface of the bottom wall.

12. The method of claim 10 wherein the molding steps set forth in paragraphs (a) and (b) are carried out by injection molding.

13. The method of claim 10 including the formation of closures at opposite ends of the compartment, each of said closures being formed in two segments, said method including molding each segment as a continuous extension of one of the upper wall segments and at an angle relative to the position it assumes in the completed member said segments closing opposite ends of the compartment after carrying out step (c).

14. The method of claim 13 including the steps of molding a first connector as part of one segment of each end closure and molding a second connector as part of the other segment of each end closure, said first and second connectors being adapted to cooperate with each other to aid in retaining the member in its completed orientation after carrying out step (c).

15. The method of claim 13 including molding the end segments of the end closures and the upper wall segments forming the split upper wall at an angle substantially 90° to the position they assume in the completed manner.

16. The method of claim 15 including molding the upper wall segments so that they will be spaced from each other in the completed manner to form a narrow slot communicating with the compartment.

* * * * *

UNITED STATES PATENT AND TRADEMARK OFFICE
CERTIFICATE OF CORRECTION

PATENT NO. : 4,210,043

DATED : July 1, 1980

INVENTOR(S) : Kenard E. Urion et al

It is certified that error appears in the above-identified patent and that said Letters Patent is hereby corrected as shown below:

Delete claims 10-16.

On the title page "16 Claims" should read
-- 9 Claims --.

Signed and Sealed this

Third Day of August 1982

[SEAL]

Attest:

GERALD J. MOSSINGHOFF

Attesting Officer     Commissioner of Patents and Trademarks